Dec. 7, 1954   T. V. KIDD   2,696,431
AGGLOMERATING FINELY DIVIDED LEAD
Filed Aug. 22, 1952

INVENTOR
Thomas V. Kidd
BY Edwin C. Woodhouse
ATTORNEY

United States Patent Office 2,696,431
Patented Dec. 7, 1954

2,696,431

AGGLOMERATING FINELY DIVIDED LEAD

Thomas V. Kidd, Penns Grove, N. J., assignor to E. I. du Pont de Nemours and Company, Wilmington, Del., a corporation of Delaware Application August 22, 1952, Serial No. 305,833

14 Claims. (Cl. 75—0.5)

This invention relates to a process for agglomerating finely divided lead in aqueous slurries thereof.

Tetraethyl lead is manufactured by the reaction of an excess of ethyl chloride with an alloy of lead and sodium. After the reaction is completed, the excess ethyl chloride is distilled off from the reaction mass, the reaction mass is drowned in water and the tetraethyl lead is removed therefrom by steam distillation. During such process, the sodium of the alloy is mostly converted to sodium chloride, about 25% of the lead in the alloy is converted to tetraethyl lead, and the remainder of the lead is converted to metallic lead in finely divided form. A small proportion of the alloy does not react with the ethyl chloride and, upon drowning in water, is converted to NaOH and finely divided lead. The lead is suspended in the dilute solution of sodium chloride and sodium hydroxide. Such suspension is then conveyed to a sludge pit where it is allowed to settle to form an upper layer of the aqueous solution of salt and caustic and a lower layer of aqueous sludge which comprises the lead mixed with from about 8% to about 20% by weight of the aqueous solution. The water layer is drawn off and the aqueous sludge is washed with water to remove most of the salt and caustic, then dried to remove most of the water, and the resulting lead is refined by melting in a reverberatory furnace at about 700° C. to about 900° C. This process of handling the lead sludge is expensive and hazardous throughout, because of the presence of residual tetraethyl lead therein. It requires extensive facilities in the form of sludge pits, driers, furnaces and equipment for handling the sludge, and large amounts of heat.

Recently, there have been developed continuous processes for reacting ethyl chloride with lead-sodium alloy and for treating the reaction mixture with water and steam to distill off the ethyl chloride and the tetraethyl lead. Such continuous processes introduce still further problems in the handling of the sludge and the recovery of the lead therefrom.

When the reaction masses are treated with water and steam to remove the tetraethyl lead therefrom by distillation, the originally finely divided metallic lead has an extreme tendency to agglomerate to an uncontrollable extent, eventually forming large intractable masses which are very troublesome to remove from an ordinary still pot and which plug continuous distillation equipment and render it inoperative. This has been effectively overcome by adding still aids to the reaction masses before or during treatment of such reaction masses with water and steam. Such still aids, such as sodium dichromate, effectively prevent the agglomeration of the lead particles, maintain them in finely divided form, and aid in the removal of the tetraethyl lead from the reaction masses.

Denison and Whitman, in application Serial No. 232,852, filed June 21, 1951, disclose that such aqueous slurries of finely divided lead can be pressed between opposing solid pressure members at pressures of at least 1,000 pounds per square inch to express nearly all of the aqueous solution and to compact the lead particles into the form of sheets, strips, flakes, pellets or bricks, which process is adapted to be carried out in a continuous manner and is particularly suitable for use with continuously produced slurries. However, it has been found that the still aids, particularly the more effective still aids when used in the continuous distillation processes, frequently produce such fine dispersions of the lead particles that it is quite difficult to convert the lead particles to flakes, pellets, and the like by the method of Denison and Whitman. Also, such fine dispersions are difficult to wash without loss of lead in the wash water. Thus, it is difficult to set and maintain an amount of a still aid which will prevent undesirable agglomeration of the lead in the distillation equipment and which, at the same time, will not prevent efficient operation of subsequent processing procedures, such as washing, settling, and compacting of the lead.

It is an object of my invention to provide a novel process for treating aqueous slurries of finely divided lead so that the particles of lead are agglomerated to particles of a materially larger size. Another object is to provide such a process which, at the same time, will not cause the particles to form large masses. A particular object is to provide a novel process for treating aqueous slurries of finely divided lead so as to cause the particles of lead to agglomerate to non-sticky, free-flowing particles of materially larger but limited size which do not tend to coalasce into large masses and which are particularly suitable for further processing, such as washing, settling, and compacting into pellets and the like. Other objects are to advance the art. Still other objects will appear hereinafter.

The above and other objects may be accomplished in accordance with my invention which comprises mixing an aqueous slurry of finely divided lead, in which the lead particles have average radii of less than 75 microns and are in a concentration of from about 15% to about 75% by weight, which slurry has a pH of from about 5 to about 11 and which slurry is at a temperature of from about 20° C. to 100° C., with from about 0.2% to about 5% by weight based on the lead of a fatty acid composition which is liquid at the temperature employed and which is a member of the class consisting of mixtures of fatty acids of 16 to 20 carbon atoms of which at least 80% are unsaturated acids and 5% to about 60% are dienic acids and which mixtures have iodine numbers greater than 80, single saturated fatty acids of 10 to 31 carbon atoms, and mixtures of fatty acids of 10 to 31 carbon atoms of which at least 80% are saturated acids and which mixtures have iodine numbers no greater than 10, and subjecting the mixture to vigorous mechanical agitation for at least 2 minutes, such process being carried out substantially in the absence of oxygen.

By such process, the particles of the finely divided lead are agglomerated to more than twice their original size, usually from 3 to 20 times their original size and up to about 2 millimeters in diameter. Such agglomerated particles are non-sticky and non-flocculating and hence do not tend to coalesce into large masses or cakes. They form free-flowing slurries which can be handled as liquids. The agglomerated particles can be readily settled out of the liquid phase and washed with water to remove soluble impurities without loss of lead in the wash water, and the resulting slurries are particularly well adapted to be treated by the method of Denison and Whitman hereinbefore referred to, wherein the slurries are pressed between pressure members to remove the liquid phase and to compact the lead particles into flakes, pellets and the like. Other closely related fatty acids, which are outside the scope of my invention, will sometimes act as agglomerating agents, but are usually less effective and have the very serious disadvantages of producing sticky, flocculating products which tend to coalesce further into large masses and cakes and hence do not form free-flowing slurries.

The slurries, which are to be treated in accordance with my invention, are dispersions of finely divided lead in an aqueous medium which has a pH of from about 5 to about 11, and in which slurries the lead particles have average radii of less than 75 microns and are in a concentration of from about 15% to about 75% by weight. My process is particularly adapted for use in the treatment of the slurries obtained by the distillation of ethyl chloride and tetraethyl lead from the reaction masses produced in the manufacture of tetraethyl lead and, especially, the slurries obtained in the continuous processes of making tetraethyl lead.

Ordinarily, the particles of lead in the slurries will have average radii of from about 20 to about 50 microns, with some particles as small as 10 microns or less. However, my process can be used with slurries in which the lead particles have average radii of 10 microns or less. Slurries, containing materially less than about 15% by weight of lead, are difficult to agglomerate, produce smaller agglomerated particles, require vessels which are uneconomically large, and also involve the removal of excessive amounts of water. Slurries, containing more than about 75% by weight of lead, are difficult to agitate and require elaborate agitating means to provide efficient agitation. For best results, the slurry should contain the lead in a concentration of from about 25% to about 70% by weight. The concentration may be adjusted to that desired by dilution with water or by settling and decanting off excess solution.

The slurries may contain all of the sodium chloride and sodium hydroxide that are present in the original reaction mixtures, or they may first be washed with water to remove all or most of the salt and the caustic. Unless the washing is very thorough, the slurries will usually contain from about 2% to about 10% by weight of sodium chloride dissolved in the water. Also, ordinarily, the slurries will contain the still aids, such as sodium dichromate, which were employed in the distillation procedure, or reaction products thereof such as lead chromate.

During the handling of the slurries prior to treatment by the process of my invention and, particularly, during the distillation and washing procedures, the surfaces of the lead particles usually become oxidized. In most cases, the amount of such lead oxide will be less than 1% by weight of the lead and should not be materially greater than about 5% by weight, covering the surfaces of the particles. Accordingly, the percentages of lead in the slurries, as specified herein, include that present as lead oxide as well as the unoxidized lead. While the presence of such lead oxide does not materially affect the process of my invention or the results obtained thereby, it is objectionable in the subsequent refining of the lead. Accordingly, it is desirable to carry out my process substantially in the absence of oxygen and, preferably, under an atmosphere of an inert gas, such as nitrogen, so as to prevent as far as possible further oxidation of the lead particles.

As produced in the manufacture of tetraethyl lead, the slurries will ordinarily have a pH of about 11 due to the sodium hydroxide formed by the reaction of the water on the residual sodium in the reaction mass. However, the amount of the sodium hydroxide and the pH may be reduced by settling and washing the lead and then redispersing it in water. Also, the slurries may be neutralized or acidified down to a pH of about 5 by treatment with a non-agglomerating, non-oxidizing acid, such as hydrochloric acid, sulfuric acid and acetic acid. Generally, the rate and degree of agglomeration are greater when the initial pH and salt content of the slurries, and the degree of oxidation of the lead particles, are low.

The fatty acid compositions which may be employed in accordance with my invention may be divided into 3 groups as follows:

1. Mixtures of fatty acids of 16 to 20 carbon atoms, at least 80% of which are unsaturated acids and 5% to about 60% of which are dienic acids, and which mixtures have iodine numbers greater than 80;

2. Single saturated fatty acids of 10 to 31 carbon atoms; and

3. Mixtures of fatty acids of 10 to 31 carbon atoms of which at least 80% are saturated acids, and which mixtures have iodine numbers no greater than 10; i. e. mixtures of saturated fatty acids of 10 to 31 carbon atoms which may contain small amounts of unsaturated acids as impurities, but not enough to give the mixture an iodine number greater than 10.

Ordinarily, the fatty acid compositions are those obtained by hydrolysis of natural fats and oils of both animal and vegetable origin, including those obtained by further processing, such as distillation, solvent extraction and the like, to obtain compositions predominating in particular desired acids. Usually, the mixtures of fatty acids, in which 80% are unsaturated acids, will contain small amounts of saturated acids, such as palmitic acid and stearic acid, as well as the singly unsaturated acids, such as oleic acid, along with the doubly unsaturated (dienic) acids. The dienic acids may have their two double bonds conjugated or unconjugated, as in linoleic acid. Such mixtures may also contain triply unsaturated (trienic) acids, such as linolenic acid. When the fatty acids or mixtures thereof are obtained by the hydrolysis of oils and fats, they will, unless specially purified, usually contain minor amounts of unsaponifiable matter (usually sterols), hydroxy acids such as ricinoleic acid, and sometimes rosin acids, but such minor constituents do not deleteriously affect the functions of the fatty acids in the process of my invention. The mixtures of acids may also be obtained by blending.

The operation should be carried out at a temperature of from about 20° C. to 100° C., the temperature being above the melting point of the acid or mixture of acids employed. Temperatures above 100° C. are usually objectionable because of loss of water due to boiling and a tendency for the mixture to foam. Preferably, the operation is carried out at a temperature of from about 85° C. to about 95° C.

The slurry and the fatty acid composition may be charged into a suitable vessel and then agitated, or either may be added to the other with agitation, or both may be added simultaneously to a suspension in which the agglomeration has already been started. The process is well adapted to continuous operations of various well known types, such, for example, as continuously passing streams of the acid composition and of the slurry, simultaneously and in the desired proportions, into an agglomerating vessel and continuously withdrawing the slurry of agglomerated material from the vessel. Preferably, the acid composition is employed as such, but it may be employed as a dispersion in water.

The fatty acid composition should be employed in a proportion of from about 0.2% to about 5% by weight based on the lead in the slurry and, preferably, from about 0.5% to about 3% by weight. The amount of the agglomeration obtained and the rate at which it takes place depends largely upon the amount of the fatty acid composition employed, the larger proportions of fatty acid composition producing more rapid agglomeration and larger particles.

The mixture of slurry and fatty acid composition must be subjected to vigorous mechanical agitation for at least 2 minutes and, preferably, from about 5 minutes to about 15 minutes. Longer agitation, up to about 30 minutes, does not generally increase the particle size of the agglomerates much further, but is sometimes desirable because it tends to produce particles of more regular spherical form. Still longer periods of agitation are unnecessary and merely wasteful of power and time, but are not harmful. For example, I have continued the agitation for 4 hours without deleterious effect on the size or character of the agglomerated particles.

The apparatus employed for carrying out my process may be widely varied. Merely for illustrative purposes, the accompanying drawings show the types of apparatus employed in the examples included hereinafter. In such drawings.

Figure 1:
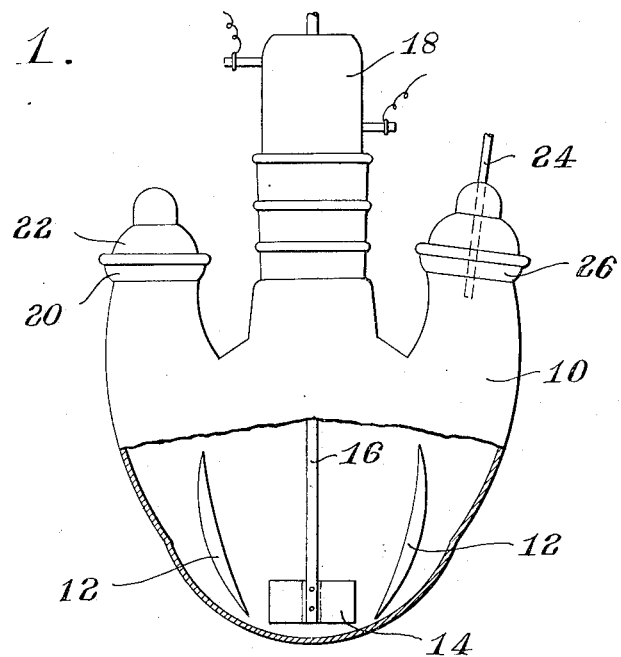
Figure 1 shows a form of apparatus employed for batch operation.

Referring first to Figure 1, the apparatus comprises a substantially spherical flask 10, the lower portion of which contains vertical creases or indentations 12 which operate to increase the turbulence when the charge is agitated. The agitation is accomplished by vertical vanes 14, about ½ the diameter of the vessel, mounted on a shaft 16 rotated by a variable speed motor 18. The flask is also provided with a charging port 20 which is closed by a stopper 22. A pipe 24 for nitrogen or other inert gas extends through the closed port 26.

In operation, the flask is flooded with nitrogen or inert gas through pipe 24. The slurry and the fatty acid composition are introduced through port 20 and the mixture is agitated by the agitator 14—16 operated by the motor 18.

Figure 2:
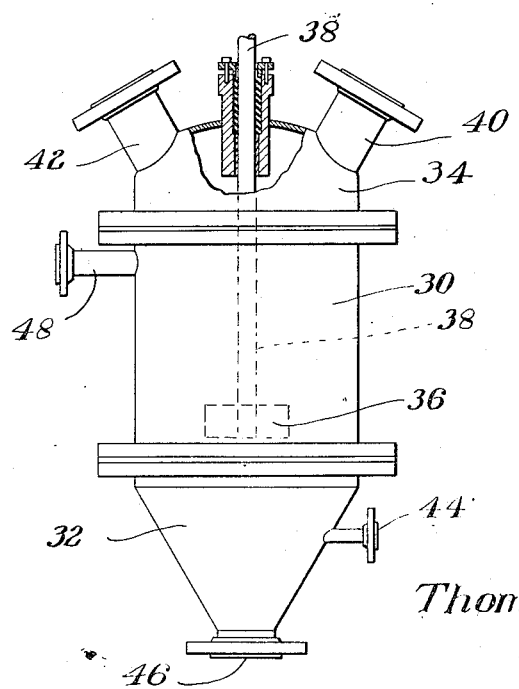
Figure 2 shows a form of apparatus employed for continuous operation.

Referring to Figure 2, the apparatus comprises a cylindrical vessel 30 provided with a conical bottom 32 and a domed top 34, and which has a capacity about 2 cubic feet. A vaned agitator 36, about ½ the diameter of the vessel 30, is rotated by a central shaft 38 which in turn is operated by a variable speed motor, not shown. The domed top 34 is provided with 2 large inlet ports 40 and 42. The conical bottom is provided with a small inlet port 44 at the side and with a large exhaust port 46 at the bottom. A port 48 is provided in the side of the cylindrical portion of the vessel for introducing instruments, if desired, for determining the temperature, density and other characteristics of the charge.

In operation, the vessel may be filled with the slurry to be treated or it may be only partially filled, in which latter case, the surface of the slurry, preferably, will be blanketed by nitrogen passing through inlet and outlet pipes (not shown) which may be fitted in the inlet port 40. Slurry to be treated is introduced continuously through inlet port 42. The acid composition, employed for causing the agglomeration, is preferably introduced under pressure without dilution through inlet port 44. Since the acid composition is much lighter than the slurry, it tends to rise through the slurry and to become thoroughly mixed therewith. Alternatively, the acid composition may be added through port 40 along with the nitrogen, when that is needed, but through a separate pipe. The acid composition thus introduced may be dropped upon the surface of the agitated slurry or may be introduced into the body of the slurry through a dip leg. In Example III, given hereinafter, the vessel was kept partly full of slurry which was blanketed with nitrogen, and the acid composition was dropped upon the surface of the agitated slurry.

In order to more clearly illustrate my invention, preferred modes of carrying the same into effect, and the advantageous results to be obtained thereby, the following examples are given, in which the parts are by weight:

EXAMPLE I 100 grams of an aqueous slurry (containing 75% by weight of lead, 0.1% by weight of sodium chloride and 0.033% by weight of sodium hydroxide), 198 g. of water, and 2 g. of a mixture consisting substantially of 9% of saturated acids, 83% of oleic acid, 2.2% of linoleic acid, and 5.7% of the corresponding acids containing two conjugated double bonds, principally 9,11-octadecadienoic acid, were charged under a blanket of nitrogen into the apparatus of Figure 1. The mixing was then carried out at 95° C. and 1450 R. P. M. Before treatment, the mean radius of the lead particles, estimated by Stokes law, was 48 microns with only about 31% by weight of the particles greater than 60 microns and with 45% by weight lying between 33 and 60 microns. After 5 minutes' agitation with the mixture of acids, these lead particles had agglomerated to the point where about 84% by weight had a radius greater than 155 microns and consisted primarily of hard spheres about 2 millimeters (2000 microns) in diameter. These could be readily compressed into compact pellets of low water content by subjecting them to a pressure of 7000 lbs. per sq. in. between plungers operating in a closed cylinder provided with an outlet for the liquid phase. The initial pH, before the addition of the mixture of acids, was about 11 and the final pH was about 7. The sodium hydroxide originally present neutralized only part of the acids. Similar results were obtained, however, when enough alkali was present to completely neutralize the acids.

EXAMPLE II

When Example I was repeated, using a sludge in which the lead particles before treatment had an average radius of 28 microns but which was otherwise the same, the final average radius of the particles was 92 microns. When the amount of water, added with the acids, was reduced from 198 to 48 grams, thus increasing the lead concentration from 25% to 50%, the particles were of practically the same size as produced with more water present. On the other hand, when the amount of added water was increased to 398 grams, giving a lead concentration of 15%, the average radius of the particles formed was 68 microns.

Good agglomeration was also obtained when the pH of the slurry was first brought to 7 or 5 by adding hydrochloric acid, which did not change the particle size, and then adding the fatty acids as above.

EXAMPLE III

An aqueous slurry of fine lead particles, containing 70% of lead and 1.5% sodium chloride and having a pH of 11, in which the mean radius of the particles was about 50 microns and only 5% by weight of the lead particles were more than 115 microns in radius, was passed downward through the apparatus of Figure 2, together with 0.5% by weight based on the lead present of the mixed fatty acids used in Examples I and II. The mixture of acids was introduced in a stream onto the surface of the agitated lead slurry, which was kept blanketed with nitrogen, and the treated slurry was continuously withdrawn from the conical bottom of the vessel. The slurry was introduced at the rate of about 4 lbs. per min., and the residence time of the mixture was about 25 minutes, that is, each increment of the mixture was retained in the vessel and subjected to the agitation for a period of about 25 minutes. The agitation required 0.03 horsepower. The particles of the resulting slurry (pH 7), which was well suited for compression into pellets, were greatly increased in size, 65% by weight of them having radii above 115 microns. When the salt content was 0.15% of the total slurry (0.5% of the water phase) but the conditions were otherwise the same, 80% by weight of the resulting agglomerated particles were more than 115 microns in radius. When the salt content was 3% (10% of the water phase), 50% by weight of the particles were greater than 115 microns in radius. The agglomerated particles were of very regular spherical form, much more so than those obtained in Examples I and II.

EXAMPLE IV

Additional tests were carried out similarly to Example I with various fatty acids and mixtures thereof and with an aqueous slurry containing 75% of lead, 2% of sodium chloride and 0.033% of sodium hydroxide, in which slurry the average radius of the particles of lead was 20 microns. The per cent by weight of particles (after agglomeration), having a radius greater than 100 microns, was taken as a measure of the degree of agglomeration obtained. The acids tested were purified oleic acid, purified palmitic acid, and the following commercial mixtures of fatty acids:

1. The mixture of acids employed in Example I;
2. a mixture of fatty acids obtained from the oil expressed from soy beans containing about 15.8% of normal straight chain saturated acids of 14 to 24 carbon atoms (10.6% palmitic acid and 2.4% of stearic acid), about 24.5% of singly unsaturated acids (23.5% oleic acid), about 51% of doubly unsaturated acid (linoleic acid), and about 8.5 of triply unsaturated acid (linolenic acid);
3. a mixture of vegetable fatty acids consisting substantially entirely of normal straight chain aliphatic monocarboxylic acids with even numbers of carbon atoms, principally 16 and 18, and which is composed approximately of 5–10% of saturated acids, 45–53% of acids with only 1 double bond, and 35–45% of acids with 2 double bonds;
4. a mixture of vegetable fatty acids consisting substantially entirely of normal straight chain aliphatic monocarboxylic acids with even numbers of carbon atoms, principally 16 and 18, and which is composed approximately of 4–6% of saturated acids, 50–60% of acids with only 1 double bond, and 10–20% of acids with 2 double bonds;
5. a mixture of fatty acids from tall oil consisting substantially entirely of normal straight chain aliphatic monocarboxylic acids with even numbers of carbon atoms, principally 16 and 18, and which is composed approximately of 6% of saturated acids, 48% of acids with a single double bond and 46% of acids with 2 double bonds;
6. a mixture of fatty acids obtained from lanolin, at least 80% of which are saturated acids of 10 to 31 carbon atoms, including both odd and even numbers of carbon atoms (most with methyl side chains), and in which those acids of 13 to 28 carbon atoms are all present in amounts between 1% and 6%;
7. a mixture of fatty acids consisting substantially entirely of normal straight chain aliphatic monocarboxylic acids with even numbers of carbon atoms and which is composed approximately of 12% palmitic acid, 20% stearic acid, 60% oleic acid and 4% doubly unsaturated acids;
8. a mixture of fatty acids of unknown composition, but which apparently consist substantially entirely of normal straight chain aliphatic monocarboxylic acids, both saturated and unsaturated, with even numbers of carbon atoms, principally 16 and 18; and
9. a mixture of fatty acids obtained from tallow still bottoms, which are of unknown composition but which apparently consist substantially entirely of normal straight chain aliphatic monocarboxylic acid, both saturated and unsaturated, with even numbers of carbon atoms, principally 16 and 18.

The results obtained with the various acids are shown in the following table:

Table

| Acid | Iodine No. | Acid No. | Degree of Agglomeration | Nature of Agglomerate |
|---|---|---|---|---|
| 1 | 89 | | 50 | free flowing. |
| 2 | 132 | 193 | 76 | Do. |
| 3 | 127 | 188 | 71 | Do. |
| 4 | 94 | 162 | 60 | Do. |
| 5 | 103 | 185 | 61 | Do. |
| 6 | 9 | | 57 | Do. |
| Palmitic | | 218 | 62 | Do. |
| Oleic | 90 | 199 | 35 | sticky. |
| 7 | 64 | | 54 | Do. |
| 8 | 60 | 196–201 | 37 | Do. |
| 9 | 60 | 170–180 | 38 | Do. |

The oleic acid and the acid mixtures 7, 8, and 9 are outside the scope of my invention and are included for purposes of comparison. The results, obtained with such acid and acid mixtures, show that, while they have some effect to cause agglomeration of the lead, they were of generally low efficiency and had the very serious objection of producing sticky, flocculent products which, on standing, coalesce still further into large masses and cakes. On the other hand, the other acids and acid mixtures (palmitic acid and acid mixtures 1 to 6) are strong agglomerating agents and produce free-flowing, non-sticky, non-flocculating products which do not tend to coalesce further into larger masses or cakes.

It will be understood that the preceding examples have been given for illustrative purposes solely and that my invention is not limited to the specific embodiments disclosed therein. It will be readily apparent to those skilled in the art that the types of apparatus employed may be very widely varied. Also, the techniques, proportions, materials, temperatures and other conditions may be varied within the limits hereinbefore given in the general description without departing from the spirit or scope of my invention.

From all of the above, it will be apparent that I have provided a novel process for treating aqueous slurries of finely divided lead, whereby the particles of lead are agglomerated to particles of much larger but limited size of very desirable properties which are particularly adapted for further processing, such as washing and separating from the aqueous phase. The resulting slurries are particularly well adapted for dewatering and compacting into flakes, pellets, and the like by the process of Denison and Whitman hereinbefore referred to. Thus, it is apparent that my invention constitutes a valuable advance in and contribution to the art.

I claim:

1. The process for agglomerating lead particles in an aqueous slurry of finely divided lead in which the lead particles have average radii of less than 75 microns and are in a concentration of from about 15% to about 75% by weight and which slurry has a pH of from about 5 to about 11, which process comprises mixing such slurry at a temperature of from about 20° C. to 100° C. with from about 0.2% to about 5% by weight based on the lead of a fatty acid composition which is liquid at the temperature employed and which is a member of the group consisting of mixtures of fatty acids of 16 to 20 carbon atoms of which at least 80% are unsaturated acids and 5% to about 60% are dienic acids and which mixtures have iodine numbers greater than 80, single saturated fatty acids of 10 to 31 carbon atoms, and mixtures of fatty acids of 10 to 31 carbon atoms of which at least 80% are saturated acids and which mixtures have iodine numbers no greater than 10; and subjecting the mixture to vigorous mechanical agitation for at least 2 minutes; such process being carried out in the absence of oxygen.

2. The process for agglomerating lead particles in an aqueous slurry of finely divided lead in which the lead particles have average radii of less than 75 microns and are in a concentration of from about 15% to about 75% by weight and which slurry has a pH of from about 5 to about 11, which process comprises mixing such slurry at a temperature of from about 20° C. to 100° C. with from about 0.2% to about 5% by weight based on the lead of a fatty acid composition which is liquid at the temperature employed and which is a member of the group consisting of mixtures of fatty acids of 16 to 20 carbon atoms of which at least 80% are unsaturated acids and 5% to about 60% are dienic acids and which mixtures have iodine numbers greater than 80, single saturated fatty acids of 10 to 31 carbon atoms, and mixtures of fatty acids of 10 to 31 carbon atoms of which at least 80% are saturated acids and which mixtures have iodine numbers no greater than 10; and subjecting the mixture to vigorous mechanical agitation for from about 5 minutes to about 30 minutes; such process being carried out under an atmosphere of an inert gas.

3. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 85° C. to about 95° C. with from about 0.2% to about 5% by weight based on the lead of a fatty acid composition which is liquid at the temperature employed and which is a member of the group consisting of mixtures of fatty acids of 16 to 20 carbon atoms of which at least 80% are unsaturated acids and 5% to about 50% are dienic acids and which mixtures have iodine numbers greater than 80, single saturated fatty acids of 10 to 31 carbon atoms, and mixtures of fatty acids of 10 to 31 carbon atoms of which at least 80% are saturated acids and which mixtures have iodine numbers no greater than 10; and subjecting the mixture to vigorous mechanical agitation for from about 5 to about 30 minutes; such process being carried out under an atmosphere of an inert gas.

4. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 20° C. to 100° C. with from about 0.5% to about 3% by weight based on the lead of a fatty acid composition which is liquid at the temperatures employed and which is a member of the group consisting of mixtures of fatty acids of 16 to 20 carbon atoms of which at least 80% are unsaturated acids and 5% to about 60% are dienic acids and which mixtures have iodine numbers greater than 80, single saturated fatty acids of 10 to 31 carbon atoms, and mixtures of fatty acids of 10 to 31 carbon atoms of which at least 80% are saturated acids and which mixtures have iodine numbers no greater than 10; and subjecting the mixture to vigorous mechanical agitation for from about 5 minutes to about 30 minutes; such process being carried out under an atmosphere of an inert gas.

5. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 85° C. to about 95° C. with from about 0.5% to about 3% by weight based on the lead of a fatty acid composition which is liquid at the temperature employed and which is a member of the group consisting of mixtures of fatty acids of 16 to 20 carbon atoms of which at least 80% are unsaturated acids and 5% to about 60% are dienic acids and which mixtures have iodine numbers greater than 80, single saturated fatty acids of 10 to 31 carbon atoms, and mixtures of fatty acids of 10 to 31 carbon atoms of which at least 80% are saturated acids and which mixtures have iodine numbers no greater than 10; and subjecting the mixture to vigorous mechanical agitation for from about 5 minutes to about 30 minutes; such process being carried out under an atmosphere of an inert gas.

6. The process for agglomerating lead particles in an aqueous slurry of finely divided lead in which the lead particles have average radii of less than 75 microns and are in a concentration of from about 15% to about 75% by weight and which slurry has a pH of from about 5 to about 11, which process comprises mixing such slurry at a temperature of from about 20° C. to 100° C. with from about 0.2% to about 5% by weight based on the lead of a fatty acid composition which is liquid at the temperature employed and which is a mixture of fatty acids of 16 to 20 carbon atoms of which at least 80% are unsaturated acids and 5% to about 60% are dienic acids and which mixture has an iodine number greater than 80; and subjecting the mixture to vigorous mechanical agitation for at least 2 minutes; such process being carried out in the absence of oxygen.

7. The process for agglomerating lead particles in an aqueous slurry of finely divided lead in which the lead particles have average radii of less than 75 microns and are in a concentration of from about 25% to about 70% by weight of which slurry has a pH of from about 5 to about 11, which process comprises mixing such slurry at a temperature of from about 20° C. to 100° C. with from about 0.5% to about 3% by weight based on the lead of a fatty acid composition which is liquid at the temperatures employed and which is a mixture of fatty acids of 16 to 20 carbon atoms of which at least 80% are unsaturated acids and 5% to about 60% are dienic acids and which mixture has an iodine number greater than 80; and subjecting the mixture to vigorous mechanical agitation for at least 5 minutes; such process being carried out under an atmosphere of an inert gas.

8. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 85° C. to about 95° C. with from about 0.5% to about 3% by weight based on the lead of a fatty acid composition which is liquid at the temperature employed and which is a mixture of fatty acids of 16 to 20 carbon atoms of which at least 80% are unsaturated acids and 5% to about 60% are dienic acids and which mixture has an iodine number greater than 80; and subjecting the mixture to vigorous mechanical agitation for from about 5 minutes to about 30 minutes; such process being carried out under an atmosphere of an inert gas.

9. The process for agglomerating lead particles in an aqueous slurry of finely divided lead in which the lead particles have average radii of less than 75 microns and are in a concentration of from about 15% to about 75% by weight and which slurry has a pH of from about 5 to about 11, which process comprises mixing such slurry at a temperature of from about 20° C. to 100° C. with from about 0.2% to about 5% by weight based on the lead of a fatty acid composition which is liquid at the temperature employed and which is a single saturated fatty acid of 10 to 31 carbon atoms; and subjecting the mixture to vigorous mechanical agitation for at least 2 minutes; such process being carried out in the absence of oxygen.

10. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 20° C. to 100° C. with from about 0.5% to about 3% by weight based on the lead of a fatty acid composition which is liquid at the temperatures employed and which is a single saturated fatty acid of 10 to 31 carbon atoms; and subjecting the mixture to vigorous mechanical agitation for at least 5 minutes; such process being carried out under an atmosphere of an inert gas.

11. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 85° C. to about 95° C. with from about 0.5% to about 3% by weight based on the lead of a fatty acid composition which is liquid at the temperature employed and which is a single saturated fatty acid of 10 to 31 carbon atoms; and subjecting the mixture to vigorous mechanical agitation for from about 5 minutes to about 30 minutes; such process being carried out under an atmosphere of an inert gas.

12. The process for agglomerating lead particles in an aqueous slurry of finely divided lead in which the lead particles have average radii of less than 75 microns and are in a concentration of from about 15% to about 75% by weight and which slurry has a pH of from about 5 to about 11, which process comprises mixing such slurry at a temperature of from about 20° C. to 100° C. with from about 0.2% to about 5% by weight based on the lead of a fatty acid composition which is liquid at the temperatures employed and which is a mixture of fatty acids of 10 to 31 carbon atoms of which at least 80% are saturated acids and which mixture has an iodine number no greater than 10; and subjecting the mixture to vigorous mechanical agitation for at least 2 minutes; such process being carried out in the absence of oxygen.

13. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 20° C. to 100° C. with from about 0.5% to about 3% by weight based on the lead of a fatty acid composition which is liquid at the temperatures employed and which is a mixture of fatty acids of 10 to 31 carbon atoms of which at least 80% are saturated acids and which mixture has an iodine number no greater than 10; and subjecting the mixture to vigorous mechanical agitation for at least 5 minutes; such process being carried out under an atmosphere of an inert gas.

14. The process for agglomerating lead particles in an aqueous slurry of finely divided lead in which the lead particles have average radii of less than 75 microns and are in a concentration of from about 25% to about 70% by weight and which slurry has a pH of from about 5 to about 11, which process comprises mixing such slurry at a temperature of from about 85° C. to about 95° C. with from about 0.5% to about 3% by weight based on the lead of a fatty acid composition which is liquid at the temperature employed and which is a mixture of fatty acids of 10 to 31 carbon atoms of which at least 80% are saturated acids and which mixture has an iodine number no greater than 10; and subjecting the mixture to vigorous mechanical agitation for from about 5 minutes to about 30 minutes; such process being carried out under an atmosphere of an inert gas.

References Cited in the file of this patent

UNITED STATES PATENTS

| Number | Name | Date |
|---|---|---|
| 1,739,717 | Gann | Dec. 17, 1929 |
| 1,913,929 | Kerschbaum | June 13, 1933 |
| 2,324,960 | Stewart | July 20, 1943 |

FOREIGN PATENTS

| Number | Country | Date |
|---|---|---|
| 124,594 | Great Britain | Apr. 3, 1919 |